(12) United States Patent
Ma

(10) Patent No.: US 6,789,654 B2
(45) Date of Patent: Sep. 14, 2004

(54) MULTIPLE COUPLING FAN DRIVE

(75) Inventor: Jiubo Ma, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/348,631

(22) Filed: Jan. 22, 2003

(65) Prior Publication Data

US 2004/0140172 A1 Jul. 22, 2004

(51) Int. Cl.$^7$ .......................... F16D 35/00; F16D 47/06
(52) U.S. Cl. .................. 192/48.1; 192/58.4; 192/58.63; 192/82 T; 416/169 A
(58) Field of Search ................. 192/48.1, 58.4, 192/58.63, 82 T; 416/169 R, 169 A; 123/41.12

(56) References Cited

U.S. PATENT DOCUMENTS

| | | | |
|---|---|---|---|
| 3,430,743 A | * | 3/1969 | Saburo et al. ............. 192/58.4 |
| 3,536,175 A | * | 10/1970 | Tsuneo et al. ............ 192/82 T |
| 4,064,980 A | * | 12/1977 | Tinholt ..................... 192/82 T |
| 4,222,353 A | | 9/1980 | Abe et al. |
| 4,224,841 A | | 9/1980 | Crooks |
| 4,275,688 A | | 6/1981 | Abe et al. |
| 4,381,051 A | * | 4/1983 | Kikuchi ..................... 192/82 T |
| 4,467,901 A | * | 8/1984 | Hattori et al. ............. 192/82 T |
| 4,476,744 A | | 10/1984 | Crooks |
| 5,322,471 A | | 6/1994 | Bauer et al. |
| 5,782,715 A | | 7/1998 | Walton et al. |
| 6,013,003 A | | 1/2000 | Boffelli et al. |
| 6,400,568 B1 | | 6/2002 | Kim et al. |
| 6,443,282 B1 | * | 9/2002 | Kwoka ...................... 192/48.4 |

FOREIGN PATENT DOCUMENTS

JP   2000-314436 A   * 11/2000

OTHER PUBLICATIONS

C543/035/99 Radial fan and externally controlled viscous clutch for radial truck cooling system CCS W. Zobel et al. Filderstadt, Germany.

* cited by examiner

Primary Examiner—Rodney H. Bonck
(74) Attorney, Agent, or Firm—Liza J Meyers

(57) ABSTRACT

A multiple coupling fan drive provides power to a fan in a cooling system. An input shaft drives a constant viscous coupling and a variable viscous coupling, both of which are operative to drive the fan.

16 Claims, 1 Drawing Sheet

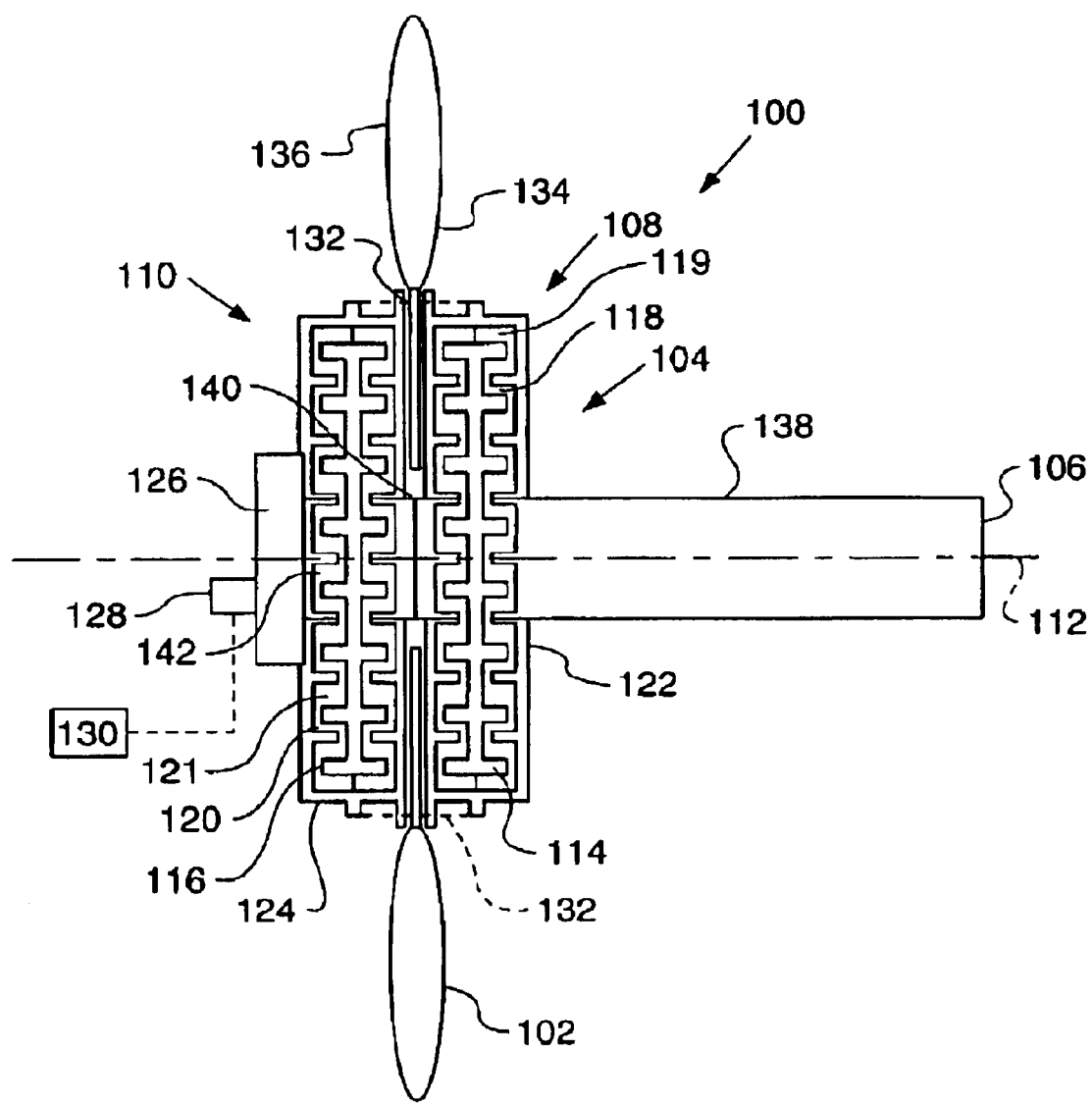

MULTIPLE COUPLING FAN DRIVE

TECHNICAL FIELD

The present invention relates to a fan drive and, more particularly, to a cooling system which uses a constant viscous coupling and a variable viscous coupling to drive the fan.

BACKGROUND

A vehicle powered by an internal combustion engine generally requires an air circulation system in the engine compartment to avoid overheating of the engine. The air may be forced throughout the engine compartment to cool the engine directly, and/or may be directed into a heat exchanging system which dissipates heat from an engine coolant system. A fan is the most commonly used device to provide airflow, and the fan is normally powered by the engine crankshaft, directly or through an intermediate linkage ("fan drive").

Because the engine compartment is often crowded, the fan and its associated fan drive mechanisms should be compact and simple to service. In addition, vehicle manufacturers must balance governmental noise emissions regulations with the need for engine cooling, so a fan having a variable speed is used to reduce the fan noise by slowing the fan when the engine compartment needs less cooling. For these reasons, it is common for a variable viscous coupling/clutch to provide power transmission in the fan drive.

An example of a cooling system using a variable viscous coupling is disclosed in the undated document titled "C543/035/99: Radial fan and externally controlled viscous clutch for radial truck cooling system CCS™", authored by W. Zobel et al. (hereafter referenced as C543). The cooling system of C543 includes a variable viscous coupling which is used to transmit power from an input shaft to a fan. However, a variable viscous coupling may have trouble producing the initial torque needed to start the fan turning due to the flow rate of the viscous fluid filling the coupling. Also, should the viscous fluid escape the single viscous coupling system, the fan may experience a loss of power that can lead to engine overheating.

Various prior art viscous couplings have included two or more primary disks in a single housing. This arrangement does not have as much capacity to dissipate heat produced in operation from the primary disks through the multi-disk housing as does the more common single-disk housing arrangement, since the multi-disk housing has much less surface area per disk than does the single-disk housing. Also, the single-disk configuration is commonly available in a range of predetermined sizes and capacities and may therefore be more efficiently provided than the multi-disk version.

The present invention is directed to overcoming one or more of the problems as set forth above.

SUMMARY OF THE INVENTION

In an exemplary embodiment of the present invention, a multiple coupling fan drive is disclosed. The multiple coupling fan drive includes: an input shaft adapted to rotate selectively about a longitudinal axis, a constant viscous coupling including a constant primary disk rotated by the input shaft, and a variable viscous coupling including a variable primary disk rotated by the input shaft.

In an exemplary embodiment of the present invention, a method of operating and powering a fan is disclosed. The method includes the steps of: selectively rotating an input shaft, selectively rotating a constant viscous coupling with the input shaft, selectively rotating a variable viscous coupling with the input shaft, and rotating the fan with at least one of the constant viscous coupling and the variable viscous coupling.

In an exemplary embodiment of the present invention, a cooling system is disclosed. The cooling system includes: a fan, a temperature sensor adapted to produce a temperature value, and a multiple coupling fan drive. The multiple coupling fan drive includes: an input shaft adapted to rotate selectively about a longitudinal axis responsive to the temperature value, a constant viscous coupling adapted to rotate the fan and including a constant primary disk rotated by the input shaft, and a variable viscous coupling adapted to rotate the fan and including a variable primary disk rotated by the input shaft.

BRIEF DESCRIPTION OF THE DRAWINGS

FIG. 1 is a partial side view of a cooling system including an exemplary embodiment of the present invention.

DETAILED DESCRIPTION

A cooling system 100 according to the present invention is depicted in FIG. 1. The cooling system 100 includes a fan 102 and a multiple coupling fan drive, shown generally at 104. The multiple coupling fan drive 104 includes an input shaft 106, a constant viscous coupling (CVC) 108, and a variable viscous coupling (VVC) 110.

The input shaft 106 is adapted to rotate about a longitudinal axis 112, driven by an outside force. The input shaft 106 may be driven in any suitable manner, but is commonly driven in an engine cooling application by a connection to a crankshaft of the engine (not shown) and will be described as such below. The connection may be direct (the input shaft 106 being substantially an extension of the crankshaft) or indirect (the input shaft 106 being connected to the crankshaft by a linkage such as a belt/pulley, gear train, or the like). When the connection is indirect, the input shaft 106 may optionally be disconnected from the crankshaft in a known manner at will such that the input shaft 106 rotates selectively about the longitudinal axis 112 and need not rotate constantly.

According to an exemplary embodiment of the present invention, the CVC 108 and VVC 110 are both of the types known in the art. Namely, each has a primary disk rotated by the outside force, a housing adapted to rotate separately from the primary disk, and a fluid located within the housing and operable to transmit torque (and therefore rotary motion) from the primary disk to the housing. The housing is attached to a driven element, shown in the FIGURE of this embodiment as the fan 102. Therefore, the driven element is indirectly powered by the outside force. The fluid is the main difference in these two types of couplings. The CVC 108 contains a fixed amount of fluid during operation, whereas the fluid level in the VVC 110 can be varied for the desired response. The torque transmission within the VVC 110 varies in direct relation with the amount of fluid extant in the housing of the VVC 110. Individual elements of the CVC 108 and the VVC 110 as utilized in the present invention will be discussed below.

The CVC 108 and VVC 110 in the present invention will now be described with reference to FIG. 1. The input shaft 106 will be assumed to be rotating about the longitudinal axis 112. The CVC 108 includes a constant primary disk 114 and the VVC 110 includes a variable primary disk 116, and both the constant and variable primary disks 114,116 are attached to the input shaft 106 and are rotated by the input shaft 106. The CVC 108 includes a constant coupling fluid chamber 119 containing a constant coupling fluid 118. The VVC 110 includes a variable coupling fluid chamber 121 containing a variable coupling fluid 120. The constant and variable coupling fluids 118,120 function as described above to transmit torque from the constant and variable primary disks 114,116, respectively, to constant and variable coupling housings 122,124, and thereby to the fan 102.

The VVC 110 includes a variable coupling reservoir 126 adapted to hold a quantity of that variable coupling fluid 120 which is not currently being used within the VVC 110. The VVC 110 also includes a variable coupling actuator 128 which acts in a known manner to selectively transfer variable coupling fluid 120 between the variable coupling reservoir 126 and the variable coupling housing 124. The variable coupling actuator 128 may be self-powered or powered by an outside source. Examples of suitable variable coupling actuators 128 are pumps, valves, and the like. Neither the variable coupling reservoir 126 nor the variable coupling actuator 128 need be directly mounted to the VVC 110 or to each other, but may be located elsewhere and interconnected in a known manner.

Optionally, a temperature sensor 130 detects a temperature value related to the device being cooled by the cooling system 100. The temperature value may be sent directly to the variable coupling actuator 128 (shown by the dashed line in FIG. 1) or to an electronic control module (not shown). In the first instance, the temperature value detected by the temperature sensor 130 may cause a change in the variable coupling actuator 128 directly. In the second instance, the electronic control module may receive the temperature value and control the variable coupling actuator 128 responsively.

In the cooling system 100, the CVC 108 and VVC 110 act to drive the fan 102. Therefore, the constant and variable coupling housings 122,124 are attached to the fan 102 in any suitable manner; for example, one or more fasteners 132 could link the three elements together as shown in FIG. 1. The fan 102 or individual blades of the fan 102 could also or instead be formed integrally with one or more of the constant and variable coupling housings 122,124. In addition, the fan 102 can be located in any suitable position with respect to the CVC 108 and VVC 110. In the exemplary embodiment shown in FIG. 1, the fan 102 is located between the CVC 108 and the VVC 110 along the longitudinal axis 112. The CVC 108 is attached to a first side 134 of the fan 102, and the VVC 110 is attached to a second side 136 of the fan, longitudinally spaced from the first side 134. This example does not limit arrangements having both the CVC 108 and VVC 110 both being located on a same one of the first and second sides 134,136, or any other positioning covered by the claims of the present invention.

The input shaft 106 may be formed as one or more pieces. An example of a multipiece input shaft 106 is shown in FIG. 1. The input shaft 106 includes an input shaft driven portion 138, an input shaft coupling joint 140, and an input shaft extension portion 142. The input shaft coupling joint 140 transmits motion between the input shaft driven portion 138 and the input shaft extension portion 142. This may be accomplished in any suitable manner—for example, the input shaft driven portion 138 may fit around the input shaft extension portion 142 in a splined sleeve relationship at the input shaft coupling joint 140. The input shaft coupling joint 140 may be made up of portions of the input shaft driven portion 138 and the input shaft extension portion 142 or may include one or more separate joining elements (not shown). When a multipiece input shaft is used, the constant primary disk 114 is rotated by one of the input shaft driven portion 138 and the input shaft extension portion 142. The variable primary disk 116 is rotated by the other of the input shaft driven portion 138 and the input shaft extension portion 142.

INDUSTRIAL APPLICABILITY

In operation, a cooling system 100 according to the present invention acts to provide airflow to a desired device to be cooled. However, airflow could be directed to the device for ventilation, warming, or any other suitable purposes without departing from the spirit and scope of the present invention.

In an exemplary embodiment of the present invention, the input shaft 106 rotates, thereby rotating the constant and variable primary disks 114,116. Since the CVC 108 always includes constant coupling fluid 118, torque from the input shaft 106 travels through the constant primary disk 114 and is transmitted by the constant coupling fluid 118 to the constant coupling housing 122. The fan 102 is attached to the CVC 108 and is driven at a minimum speed by rotation of the constant coupling housing 122. Should the VVC 110 be devoid of variable coupling fluid 120, the CVC 108 rotates the variable coupling housing 124, either through a direct attachment or using the fan 102 as an intermediate member. The variable primary disk 116 may still be rotating within the variable coupling housing 124 through action of the input shaft 106, but that rotation is not transferred to the variable coupling housing 124.

In order to take advantage of the variable primary disk 116 motion and increase the speed of the fan 102 by transmitting more torque from the input shaft 106 to the fan 102, the variable coupling actuator 128 transfers variable coupling fluid 120 from the variable coupling reservoir 126 into the VVC 110. The fluid transfer is possibly responsive to the temperature value or to any other suitable predetermined "trigger value" intended to bring about a desired change in the speed of the fan 102. A trigger value may be related to the device to be cooled and could be readily taken from any of a number of sensors, lookup tables, equations, clocks, algorithms, combinations thereof, or the like. As the VVC 110 fills with variable coupling fluid 120, the variable primary disk 116 begins to transmit torque to the variable coupling housing 124. The fan 102 will then be driven by the VVC 110. Should the VVC 110 achieve a sufficiently high rotational speed, the motion of the VVC 110 will begin to rotate the constant coupling housing 122 faster than it is being driven by the constant primary disk 114. However, the torque transfer characteristics of the constant coupling fluid 118 should be sufficient to prevent resultant torque feedback from the constant coupling housing 122 to the constant primary disk 114.

The amount of variable coupling fluid 120 in the VVC 110 can be controlled and changed by the variable coupling actuator 128 at will and is anticipated to be infinitely variable between completely full and completely empty configurations in order to vary the fan 102 speed above the minimum speed provided by the CVC 108. The amount is only limited by the fluid capacity of the variable coupling reservoir 126, such capacity being most efficiently made substantially the same as the fluid capacity of the variable coupling housing 124. As variable coupling fluid 120 is added to the VVC 110, more torque is transferred from the variable primary disk 116 and the variable coupling housing 124 rotates faster. When variable coupling fluid 120 is drained from the VVC, the variable coupling housing 124 rotation slows.

In contrast to the VVC 110, the amount of constant coupling fluid 118 within the CVC 108 does not change during normal operation of the cooling system 100. It is anticipated by the present invention that an amount and/or type of constant coupling fluid 118 in the CVC 108 could be changed during repair or maintenance, but not operation, of the multiple coupling fan drive 104 to change fan speed response during later operation. Such a fluid change could easily be accomplished through a plug or port in the constant coupling housing 122. However, since CVC 108 and VVC 110 units are relatively inexpensive, an operator wishing to semi-permanently change the fan speed response in this manner may instead opt to replace the initial CVC 108 and/or VVC 110 with new units.

Optionally, the multiple coupling fan drive 104 of the present invention may be driven in any of three modes, preferably responsive to a temperature value produced by at least one of a temperature sensor 130 and an electronic control module. It is envisioned that the multiple coupling fan drive 104 will be switched between the modes as needed and regardless of the on/off status of the cooling system 100. Those three modes are a fan disengaged mode (with no driving force provided to the multiple coupling fan drive 104), a fan CVC only mode, and a fan CVC and VVC engaged mode as described above. Any of the modes may be employed exclusively of the others for as long a time as desired for a given application—an engine, for example, may only require the third (fan CVC and VVC engaged) mode during the entire life of the engine.

Since efficiency of the CVC 108 and the VVC 110 is much lower than that of a direct mechanically-attached joint (such as a bolted, flanged, or other non-fluid, non-viscous joint), the CVC 108 and, to a lesser extent because of its variable operation, the VVC 110 act to "step down" the input shaft 106 speed such that the fan 102 is not mechanically required to turn at the same speed as the input shaft 106. This may particularly be desired when the input shaft 106 speed is substantially the same as the crankshaft speed and a fan 102 might be harmed by prolonged rotation at the crankshaft speed. A desired speed reduction may be readily accomplished by one skilled in the art through specification of a predetermined constant coupling fluid 118 or of the CVC 108 itself. It should be noted that this speed reduction is accomplished without gears or other costly and complex mechanisms and may be adjusted at will through changes in the constant coupling fluid.

Other aspects, objects and advantages of the present invention can be obtained from a study of the drawings, the disclosure and the appended claims.

What is claimed is:

1. A multiple coupling fan drive, comprising:
   an input shaft adapted to rotate about a longitudinal axis;
   a constant viscous coupling including a primary disk rotated by the input shaft and a constant coupling fluid chamber; and
   a variable viscous coupling including a primary disk rotated by the input shaft and a variable coupling fluid chamber.

2. The multiple coupling fan drive of claim 1, including a fan driven by at least one of the constant viscous coupling and the variable viscous coupling.

3. The multiple coupling fan drive of claim 2, wherein the fan is located between the constant viscous coupling and the variable viscous coupling along the longitudinal axis.

4. The multiple coupling fan drive of claim 2, including a temperature sensor adapted to produce a temperature value, and wherein motion of the fan is controlled responsive to the temperature value in at least one of: a fan disengaged mode, a fan constant viscous coupling only mode, and a fan constant viscous coupling and variable viscous coupling engaged mode.

5. The multiple coupling fan drive of claim 1, wherein:
   the input shaft includes a input shaft driven portion, an input shaft coupling joint, and an input shaft extension portion;
   the input shaft coupling joint transmits motion between the input shaft driven portion and the input shaft extension portion; and
   each primary disk is rotated by one or the other of the input shaft driven portion and the input shaft extension portion.

6. The multiple coupling fan drive of claim 1, including a variable coupling reservoir adapted to hold a coupling fluid, and a variable coupling actuator adapted to selectively transfer the coupling fluid between the variable coupling reservoir and a variable viscous coupling.

7. The multiple coupling fan drive of claim 6, including a temperature sensor adapted to produce a temperature value, and wherein the variable coupling actuator transfers coupling fluid between the variable coupling reservoir and the variable viscous coupling responsive to the temperature value.

8. A method of operating and powering a fan, comprising:
   selectively rotating an input shaft;
   rotating a constant viscous coupling with the input shaft;
   rotating a variable viscous coupling with the input shaft;
   rotating the fan with the constant viscous coupling; and
   selectively rotating the fan with the variable viscous coupling as a function of increasing or decreasing the volume of the variable coupling fluid in a variable fluid coupling chamber.

9. The method of claim 8, wherein the step of rotating a constant viscous coupling with the input shaft includes:
   rotating a primary disk within the constant viscous coupling with the input shaft; and
   transmitting rotation of the primary disk to a constant coupling housing.

10. The method of claim 8, wherein the step of rotating a variable viscous coupling with the input shaft includes:
    rotating a primary disk within the variable viscous coupling with the input shaft; and
    selectively transmitting rotation of the primary disk to a variable coupling housing.

11. The method of claim 10, wherein the step of transmitting rotation of the primary disk to a variable coupling housing includes:
    varying an amount of coupling fluid within the variable coupling housing.

12. The method of claim 8, wherein the step of rotating the fan with the constant viscous coupling includes:
    transmitting rotation from the constant viscous coupling to a first side of the fan.

13. The method of claim 8, wherein the step of selectively rotating the fan with the variable viscous coupling includes:
    transmitting rotation from the variable viscous coupling to a second side of the fan, longitudinally spaced from the first side of the fan.

14. A cooling system, comprising:
    a fan;
    a temperature sensor adapted to produce a temperature value; and a multiple coupling fan drive, comprising:
- an input shaft adapted to rotate about a longitudinal axis in response to the temperature value;
- a constant viscous coupling adapted to rotate the fan and including a primary disk rotated by the input shaft and a constant coupling fluid chamber; and
- a variable viscous coupling adapted to rotate the fan and including a primary disk rotated by the input shaft and a variable coupling fluid chamber.

15. The cooling system of claim 14, wherein the variable viscous coupling includes a coupling fluid, an amount of such coupling fluid being varied within the variable viscous coupling in response to the temperature value.

16. The cooling system of claim 14, wherein motion of the fan is controlled responsive to the temperature value in at least one of: a fan disengaged couplings mode, a fan constant viscous coupling only mode, and a fan constant viscous coupling and variable viscous coupling engaged mode.

* * * * *